(12) United States Patent
Reppich et al.

(10) Patent No.: US 6,658,327 B1
(45) Date of Patent: Dec. 2, 2003

(54) METHOD AND DEVICE FOR CONTROLLING A VEHICLE

(75) Inventors: Andreas Reppich, Leonberg (DE); Claus Eiss, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 09/693,741

(22) Filed: Oct. 20, 2000

(30) Foreign Application Priority Data

Oct. 23, 1999 (DE) .......................................... 199 51 119

(51) Int. Cl.$^7$ ................................................ G06F 7/00
(52) U.S. Cl. ................. 701/1; 701/35; 701/70; 701/93; 307/10.4; 307/10.5
(58) Field of Search ................ 701/1, 33, 36, 701/32, 35, 70, 93; 307/10.4, 10.5

(56) References Cited

U.S. PATENT DOCUMENTS 6,230,084 B1 * 5/2001 Kijima et al. .................. 701/1

OTHER PUBLICATIONS

Jonner et al., "Electrohydraulic Brake System—The First Approach to Break–By Wire Technology" SAE paper 960991.

* cited by examiner

*Primary Examiner*—Marthe Y. Marc-Coleman
(74) *Attorney, Agent, or Firm*—Kenyon & Kenyon

(57) ABSTRACT

A method and a device for controlling a vehicle, where an actuation variable of an operating control element operable by the driver is measured and converted into a controlled variable, using a predetermined correlation. In this case, the correlation can be changed by the driver, using a setting mechanism.

13 Claims, 3 Drawing Sheets

METHOD AND DEVICE FOR CONTROLLING A VEHICLE

BACKGROUND INFORMATION

In vehicles, multiple control systems are used which, as a function of the actuation of an operating control element operable by the driver, form at least one controlled variable (input of the driver, setpoint values, etc.) for adjusting at least one performance quantity of the vehicle. Examples of such control systems are socalled electronic accelerator systems (drive-by-wire), in which a torque of the drive unit is set as a function of the gas-pedal actuation, electrically controlled braking systems (brake-by-wire), where the braking forces generated at the wheels are set as a function of the brake-pedal actuation, or electrically controlled clutch systems, in which the clutch operation is derived from the clutch-pedal actuation. Such control systems are well-known, for example, an electrically controlled braking system from the SAE paper 960991 "Electrohydraulic Brake System—The First Approach to Break-By-Wire Technology" by Wolf-Dieter Jonner, Hermann Winner, Ludwig Dreilich, and Eberhardt Schunck. An actuation variable of a brake pedal is measured here, e.g. using a displacement or force sensor, and depending on the acquired measured signal, a value desired by the driver is ascertained as a controlled variable, especially in the form of a setpoint deceleration value. In this case, a predefined correlation of the actuation variable and the controlled variable (driver input value) is used. Under consideration of other performance quantities, such as the actual deceleration and the setpoint braking-force distribution between the front and rear axles, setpoint values (for example, setpoint pressure values) are formed for controlling the individual wheel-braking pressures. The correlation between the pedal-actuation variable and the driver input value is, for example, fixed by a predefined characteristic curve. The same is also valid for electronic accelerator systems or electronically controlled clutches. Influences of the individual driver are excluded.

Therefore, an object of the present invention is to provide measures allowing the actuation variable of an operating control element operable by the driver to be correlated to a controlled variable, which is derived from this actuation variable in a driver-specific manner.

SUMMARY OF THE INVENTION

The option of changing the correlation between an actuation variable of an operating control element and a controlled variable derived therefrom to control a performance quantity of a vehicle, i.e. the option of changing the connection between pedal actuation and its effect on the vehicle by the individual driver, has the advantage of the driver being able to set this effect himself or herself as desired, within the framework of the legal requirements. In this manner, a driver who, for example, wants a sharp brake-pedal setting can adjust it as desired in the same way as another driver wishing to have fine proportionability in the lower operating or deceleration range, and a direct response in the subsequent range.

It is especially advantageous that each driver can adjust the effect of the pedal actuation according to his or her physical capabilities, so that the driver can make an adjustment already rendering the effect of the pedal actuation high in response to a small amount of pedal travel or a small pedal force.

It is also particularly advantageous that in transferring from one vehicle to another, the driver can set his or her usual pedal-actuation effect, and in this respect, does not have to adapt to the new vehicle.

Another advantage is that the measures represented here adapt the human-machine interface to the individual needs of the respective driver, and therefore, allow the driver to control it better.

A further advantage is that the adjustment of the correlation by the driver also allows various assistant functions, e.g. a braking assistant function, to be connected or inserted by, for example, setting a correlation where the driver can easily adjust the maximum braking force on the basis of his or her individual conditions; therefore, an assistant function can be eliminated.

It is also particularly advantageous that the driver immediately (directly) experiences or feels the modified setting. In this manner, false settings are avoided.

DETAILED DESCRIPTION

Figure 1:
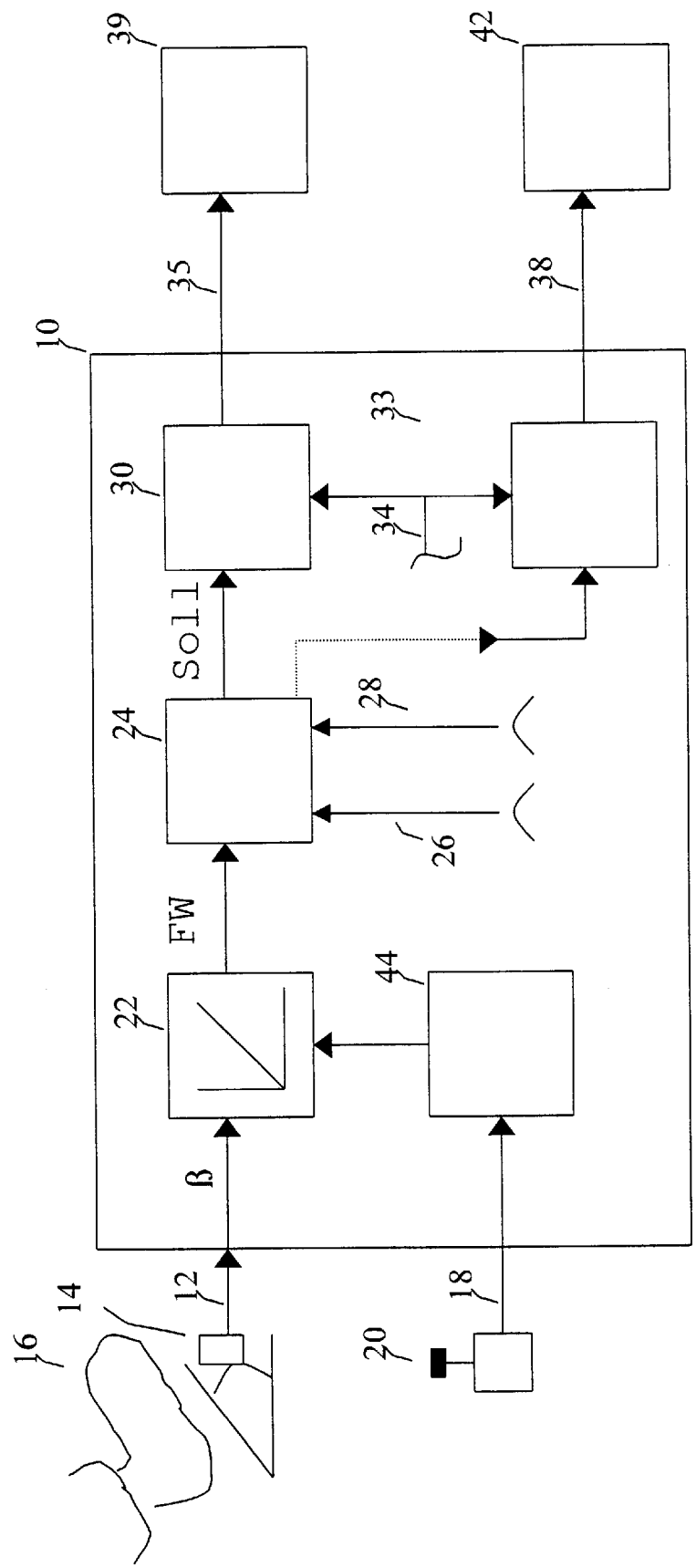
FIG. 1 shows a flowchart by example of a preferred exemplary embodiment.

Novel control systems such as electrohydraulic, electropneumatic, or electromotive braking systems, electric brake-boosting systems, electric clutches, or electronic accelerator systems allow the correlation between pedal actuation and its effect on the vehicle to be varied, e.g. by modifying the characteristic curve of the actuating element. Therefore, an appropriate adaptation of software in these systems allows various actuation/effect correlations, e.g. various pedal characteristics (correlation of actuation variable/controlled variable), to be implemented. Effect is understood to be, for example, the acceleration of the vehicle (in the case of a drive-by-wire system), deceleration (in the case of braking systems), or positive engagement (in clutch controllers). Other effect variables, such as a torque variable, a throttle-valve setting variable, a braking-force variable, a braking-torque variable, a braking-pressure variable, etc. can denote the effect of actuating the pedal.

A setting mechanism, which can be operated by the driver, is provided for the driver to be able to individually set this correlation. Using this setting mechanism, the driver can adjust the above-mentioned correlation to be discreet or continuously variable. Depending on the embodiment, an adjusting gear having discrete settings, an adjusting gear having a continuous signal that can adjust the correlation, an external storage means that carries the driver-specific data and can be connected, a memory-chip card on which driver-specific data are stored or can be stored, a programming station by means of which the driver can write a characteristic curve into a storage means, or an input keyboard, e.g. of the trip computer or the on-board computer, is provided as a setting mechanism.

Depending on the exemplary embodiment, it is possible for the driver to change the correlation to be discreet or continuously variable, as he or she desires. In the simplest embodiment, two different correlations (characteristic curves) denoted by the features sporty (sport) and comfortable (luxury) are specified. In this simplest exemplary embodiment, the change-over is accomplished using a switching element that can be actuated by the driver.

The options for variation are limited, in case it is necessary to consider limits specified by the legislature or the vehicle manufacturer. This means that certain limiting values are preset, which the driver cannot exceed using his or her setting.

In addition, the option of setting only one operating control element, e.g. only the brake pedal, of setting only two operating control elements, e.g. brake pedal and accelerator, or of setting three or more operating control elements (brake pedal, clutch pedal, accelerator) is provided, one setting in an exemplary embodiment having the corresponding effect on all the operating control elements in question (for example, in the case of a sport setting, the corresponding characteristic curves for both the brake pedal and the accelerator are selected and brought into effect). In another exemplary embodiment, the effects of the individual operating control elements are separate and can be adjusted independently of one another.

With the aid of the procedure that is described below using a preferred exemplary embodiment, it is possible for the driver to vary the correlation of the actuation variable to a controlled variable (driver input value) derived therefrom, the individual, desired performance of the respective actuator (final control element) of the vehicle being adjustable.

FIG. 1 shows a flowchart by example of an electrically controlled braking system, in which the above-mentioned procedure is implemented. FIG. 1 displays an electronic control unit 10 having at least one microcomputer not shown, in which a program represented by the flowchart of FIG. 1 runs. At least two input lines are led into control unit 10. A first input line 12 connects control unit 10 to a measuring device 14 for measuring an actuation variable $\beta$ for brake pedal 16. An input line 18 is also provided, which connects control unit 10 to a setting mechanism 20 for selecting and/or presetting a suitable correlation between actuation variable and driver input. A signal is supplied to control unit 10, in this case the microcomputer, via input line 12, the signal indicating variable $\beta$ of the brake-pedal actuation (displacement signal, force signal, etc.) by the driver. This actuation variable is converted by a characteristic curve 22 into a driver input value FW which, for example, represents a desired deceleration, a desired braking force, a desired braking torque, a desired braking pressure, etc. in the exemplary embodiment of the braking system. In view of performance quantities such as the setpoint braking-force distribution between front and rear axles, the actual deceleration, the actual braking forces, or the actual braking torques, this driver input value FW is converted in a setpoint generator 24 into forced control values SOLL for controlling the individual wheel brakes. The performance quantities used for converting the driver input into the setpoint values are supplied via symbolically represented input lines 26 through 28. The wheel-specific setpoint values formed in setpoint generator 24 are output to respective wheel-brake units 30 through 33. In the preferred exemplary embodiment, control signals are formed there according to a predefined controller strategy, in view of the actual values supplied via line 34, the control signals being output via output lines 35 through 38 to corresponding brake actuators 39 through 42. Units 30 through 33, preferably controllers, bring the actual quantities up to the predefined setpoint quantities. Controllers 30 through 33 represent pressure regulators in the preferred exemplary embodiment of an electrohydraulic braking system, while braking-torque or braking-force regulators are preferably used in connection with an electromotive braking system.

Setting mechanism 20, which is a selector switch or the input unit of a trip computer, outputs a corresponding command via line 18 to control unit 10. This is where a predetermined characteristic curve is selected from storage unit 44 according to the command read in, or where a characteristic curve from the storage unit is stored in accordance with the input, the formation of the driver input being based on the characteristic curve. In this manner, the driver is permitted to specify or select a pedal-effect characteristic according to his or her desires.

Figure 2:
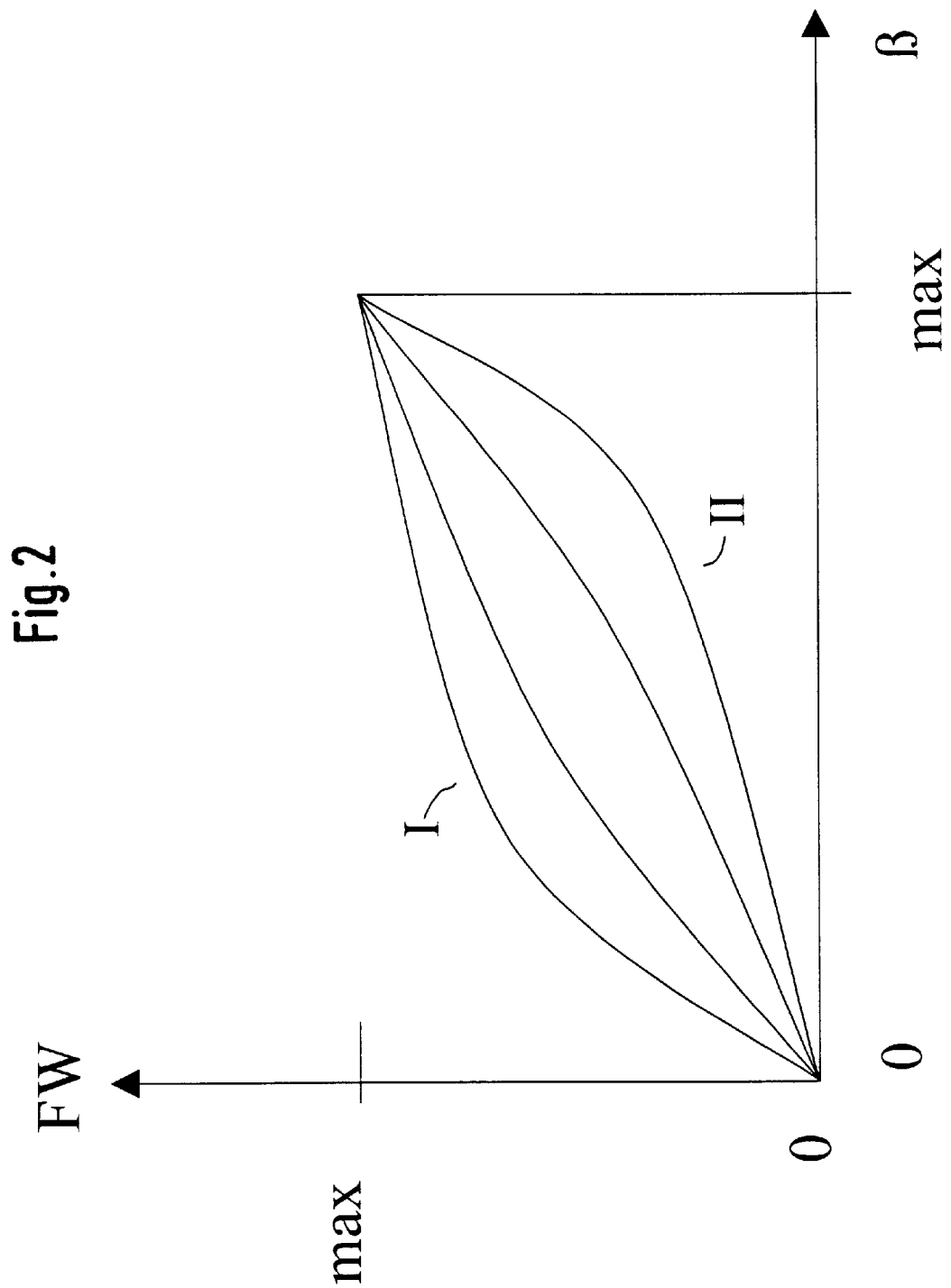
FIG. 2 displays examples of correlation characteristics that can be selected by the driver.

Examples of characteristic curves, which can be selected by means of the setting mechanism operable by the driver, are represented in FIG. 2, using a set of characteristic curves. Driver input value FW is plotted there against actuation variable $\beta$. Both values vary from 0, i.e. released brake pedal, to a maximum, i.e. completely actuated brake pedal. A set of characteristic curves is plotted, one of the displayed characteristics or, e.g. one of the intermediate characteristics acquired through interpolation, being selectable by the driver through operation of the setting mechanism. In this context, characteristic I shows a brake-pedal effect, where a very sharp braking effect is already produced by a small actuation of the brake pedal, while in characteristic II, the braking effect is finely proportioned in the lower range of brake-pedal actuation, with a sharply increasing braking effect in the higher brake-pedal range. Regarding the course of the characteristic curves, they can have any arbitrary shape conceivable within the framework of the limits (limiting characteristic curves) set by the legislature or the vehicle manufacturer.

The same is also valid in electronic accelerator systems and/or in electrically controlled clutch systems.

Figure 3:
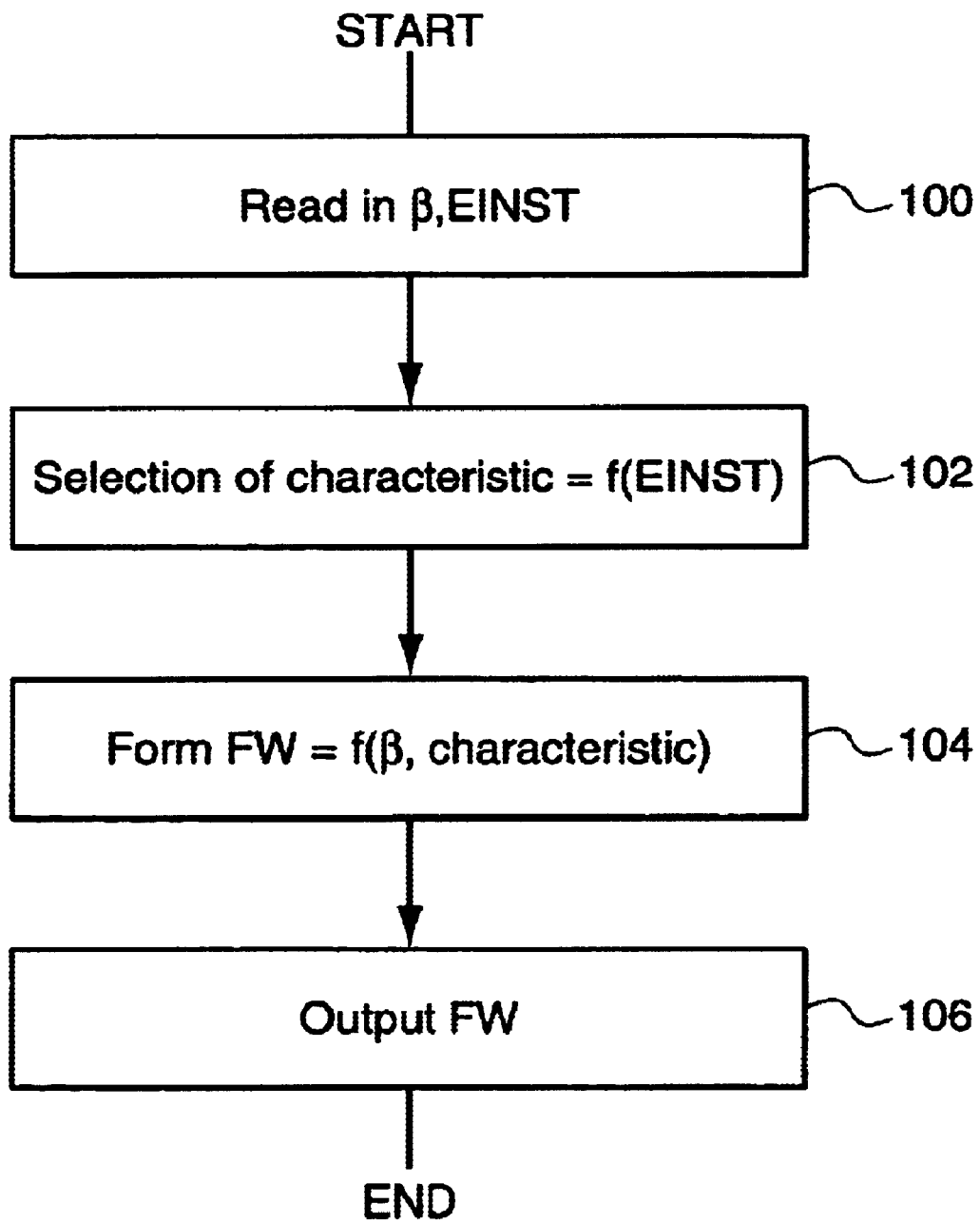
FIG. 3 shows a preferred implementation of the present invention, using a flowchart which represents the computer program for forming the driver input.

In the preferred exemplary embodiment, the procedure represented in FIGS. 1 and 2 is implemented by a program of the microcomputer of control unit 10. FIG. 3 shows an example of such a computer program. The program is started at predefined times. In first step 100, the actuation variable $\beta$, as well as the setting variable EINST selected by the driver, are input. In step 102, the corresponding brake-pedal characteristic is then selected according to the setting specified by the driver. In following step 104, driver input value FW is formed as a function of actuation variable P and the selected characteristic curve, and is subsequently output to the setpoint generator in step 106. The program is then completed and run through again at the next time.

For purposes of implementation, an exemplary embodiment uses a memory-chip card which can be provided with the individual data for each driver, these data including the correlation desired by the driver, between the actuation variable of the vehicle operating control element operable by the driver, and the effect of this actuation variable.

What is claimed is:

1. A method for controlling a vehicle, comprising the steps of:
    specifying a correlation between at least one actuation variable and an effect of the at least one actuation variable using a setting mechanism of the vehicle, the setting mechanism being operable by a driver of the vehicle;
    deriving at least one controlled variable as a function of the at least one actuation variable in accordance with the correlation; and
    controlling at least one final control element within the vehicle as a function of the at least one controlled variable.

2. The method according to claim 1, wherein the correlation is one of selected, input, and stored by the driver, using a setting mechanism.

3. The method according to claim 2, wherein the setting mechanism simultaneously acts on the correlation between the actuation variable and its effect on at least two operating control elements.

4. The method according to claim 1, wherein the correlation is a characteristic curve which is one of input and selected by the driver.

5. The method according to claim 1, wherein the actuation variable is an actuation variable of one of a brake pedal, an accelerator, and a clutch pedal.

6. The method according to claim 1, further comprising the steps of:

forming a driver input value from the actuation variable, according to the correlation; and converting the driver input value into control variables for final control elements.

7. The method according to claim 1, further comprising the steps of:

forming a driver input value from the actuation variable, according to the correlation, the actuation variable being an actuation variable of a brake pedal;

converting the driver input value into setpoint quantities for adjusting wheel-brake actuators; and setting the setpoint quantities by controlling the actuators.

8. The method according to claim 1, wherein the correlation is one of (a) continuously variable, and (b) changeable by selecting predetermined correlations.

9. The method according to claim 1, wherein the correlation is individually adjustable.

10. A device for controlling a vehicle comprising:

a control unit reading in at least one actuation variable of at least one operating control element operable by a driver within the vehicle, the control unit ascertaining at least one controlled variable as a function of the at least one actuation variable, according to a correlation between the at least one actuation variable and an effect of the at least one actuation variable, the control unit outputting at least one output signal as a function of the at least one controlled variable for controlling a final control element; and a setting mechanism operable by the driver for transmitting at least one signal to the control unit, the correlation being selected by the driver via the at least one signal during vehicle operation.

11. The device according to claim 10, wherein the setting mechanism is actuatable by the driver, and the setting mechanism includes at least one of a selector switch and an input unit of a trip computer.

12. The device according to claim 10, wherein the setting mechanism includes an input unit, the driver saving a desired characteristic curve via the input unit in a storage medium.

13. The device according to claim 10, wherein the setting mechanism includes a memory-chip card for storing individual driver data.

* * * * *

UNITED STATES PATENT AND TRADEMARK OFFICE
CERTIFICATE OF CORRECTION

PATENT NO. : 6,658,327 B1
DATED : December 2, 2003
INVENTOR(S) : Reppich et al.

It is certified that error appears in the above-identified patent and that said Letters Patent is hereby corrected as shown below:

Column 2,
Lines 52 and 64, "discreet" should be changed to -- discrete --; and

Column 4,
Line 44, "variable P" should be changed to -- variable β --.

Signed and Sealed this

Seventh Day of December, 2004

JON W. DUDAS
*Director of the United States Patent and Trademark Office*